Dec. 14, 1937.  B. CHANCE  2,102,512
AUTOMATIC STEERING MEANS
Filed May 4, 1935  3 Sheets-Sheet 1

INVENTOR
Britton Chance
BY
Augustus B. Stoughton
ATTORNEY.

Dec. 14, 1937.    B. CHANCE    2,102,512
AUTOMATIC STEERING MEANS
Filed May 4, 1935    3 Sheets-Sheet 2

WITNESS:

INVENTOR
Britton Chance
BY
Augustus B. Stoughton
ATTORNEY.

Dec. 14, 1937.   B. CHANCE   2,102,512
AUTOMATIC STEERING MEANS
Filed May 4, 1935   3 Sheets-Sheet 3

WITNESS:

INVENTOR
Britton Chance
BY
Augustus B. Stoughton
ATTORNEY.

Patented Dec. 14, 1937

2,102,512

UNITED STATES PATENT OFFICE 2,102,512

AUTOMATIC STEERING MEANS

Britton Chance, Mantoloking, N. J.

Application May 4, 1935, Serial No. 19,822

5 Claims. (Cl. 172—282)

One object of the present invention is to provide for automatically controlling the steering gear of dirigible bodies or vessels by means of a ray or beam of light or radiant energy fixed in space and of only two electronic devices or light cells.

Another object of the present invention is to provide simple and reliable means for automatically steering dirigible bodies.

Other objects of the invention will appear from the following description at the end of which the invention will be claimed.

Generally stated, the invention consists in means providing a beam or ray of light or radiant energy fixed in space; two electronic valve devices or light cells positioned on the vessel or body to be swept by the beam or ray on deviation of the vessel or body from its course; means set in operation by said devices or cells and operative to diminish the deviation of the body or vessel from its course; and follow-back means to shift the incidence of the said beam or ray with respect to said devices or cells; with or without hold-over devices effective when the beam or ray sweeps past or outside of the cells or valve devices.

The invention also consists in the improvements to be presently described and finally claimed.

In the following description reference will be made to the accompanying drawings forming part hereof and in which, Figure 1 is a diagrammatic and schematic plan view of apparatus illustrating features of the invention and showing two electronic cells or valves.

Figure 1:
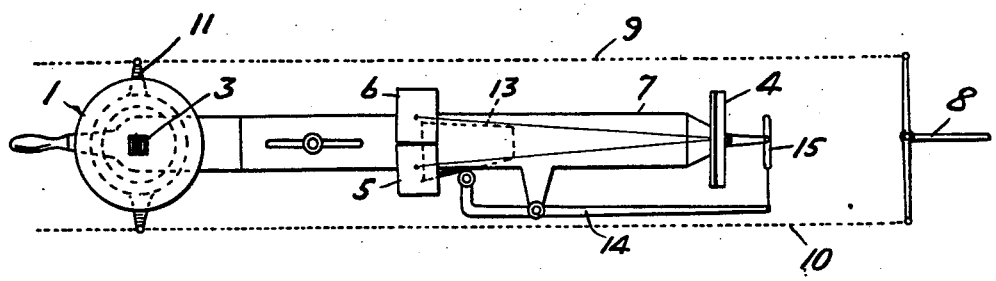
Figure 2:
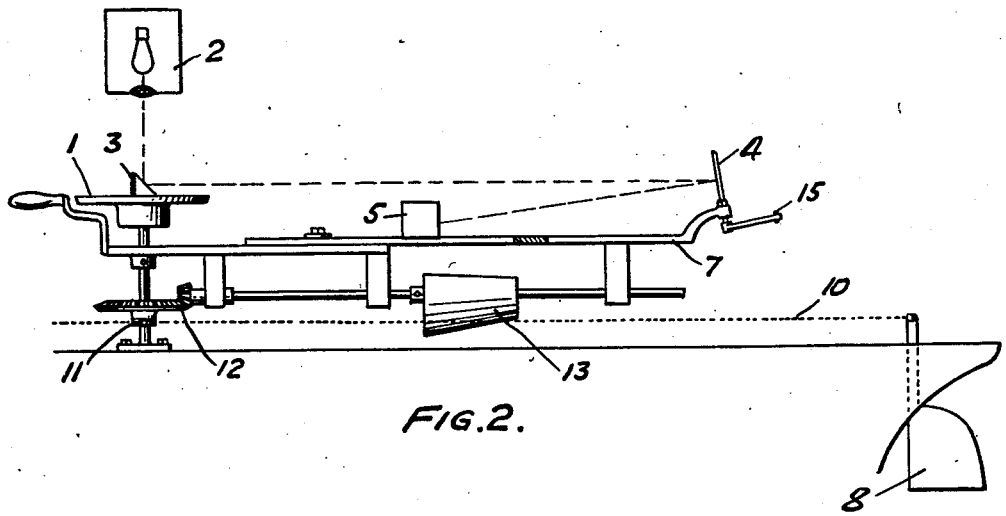
Figure 2 is an elevational view of the same including parts omitted from Figure 1.

Referring to Figures 1 and 2, it may be remarked that they are highly diagrammatic and that the device is intended to be mounted on gimbals and that while a magnetic or a gyroscopic compass may be used, the compass card 1 will be assumed to be a part of a gyroscopic compass. The light and lens 2 provide a beam or ray of light or radiant energy and this is reflected from the reflector 3 mounted on the compass card 1 to the pivotal mirror or reflector 4, and from it to the electronic cells or valve devices 5 and 6, as will be more fully described. The frame 7 is turnably mounted about the axis of the compass card 1 in order to fix the course of the vessel or body. From the rudder 8 there is a follow-back mechanism consisting as shown of the connections 9 and 10 to the yoke 11 which, through the gearing 12 and cam 13 and follower 14, turns the reflector 4 and provision is made for a dwell in the movement of the mirror or reflector 4 of which the loss motion device 15 is an example. When the dirigible, vessel, or body is on its course the ray or beam falls at the inner ends of the cells 5 and 6 and the rudder is held by the electric brake mechanism 16 (see Figs. 5 to 8), as will be described later. On deviation of the vessel or body from its course the reflected beam or ray of light or radiant energy sweeps across the valves or cells and there are means set in operation by the cells or devices and they operate to diminish the deviation of the body or vessel from its course.

Figure 3:
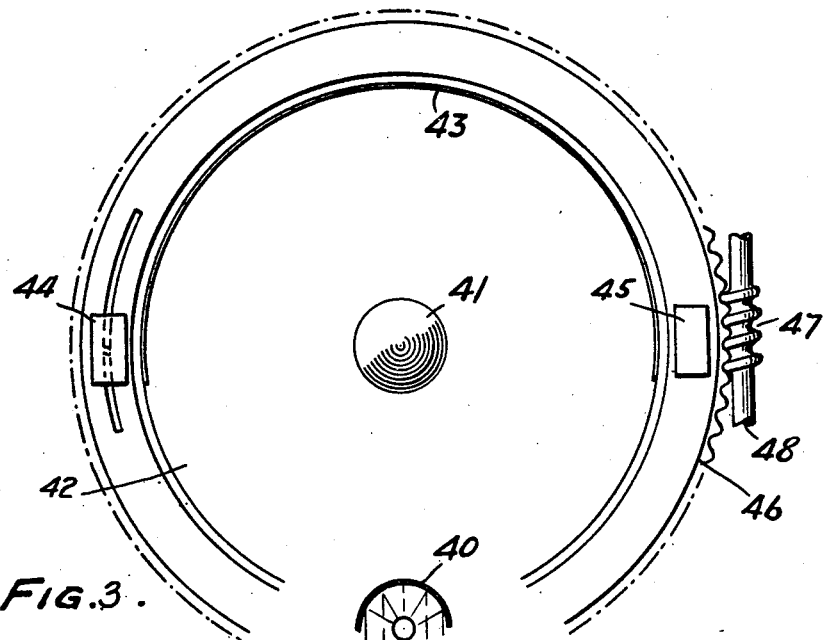
Figures 3 and 4 are respectively a plan and sectional elevation illustrating a modification.
Figure 4:
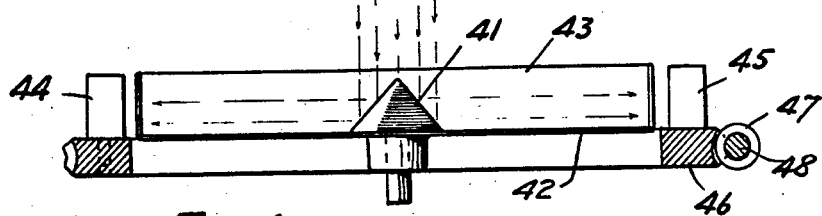
Figure 5:
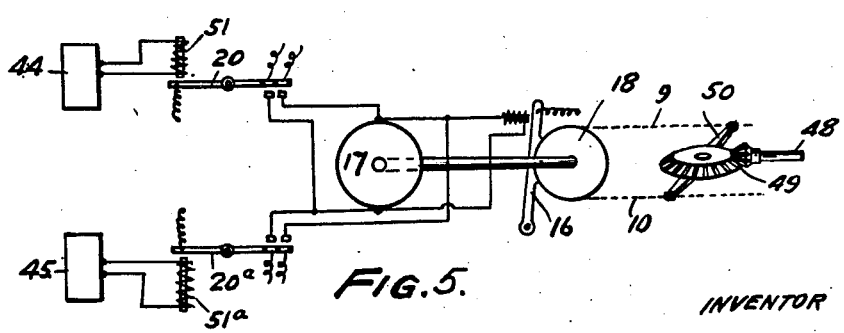
Figure 5 is a diagrammatic lay-out of circuits and connections for use with the arrangement shown or indicated in Figures 3 and 4.

The construction and mode of operation of the modification illustrated in Figures 3, 4 and 5 are as above described except as follows: The beam of light from the system 40 falls upon a reflecting cone 41 mounted on the compass card 42. The compass card is provided with a screen 43 arcuate and extending beyond the diameter of the compass card. When the vessel is on its course the screen 43 cuts off the light or radiant energy from the light cells or electronic valves 44 and 45. The electronic valves 44 and 45 are adjustably mounted on a rotatable ring 46 having gear teeth with which a worm 47 meshes. The shaft 48 of the worm 47 is, through miter gears, connected with the yoke 50, which in turn is connected with the lines 9 and 10 that operate the rudder. The parts last described constitute follow-back mechanism in which provision is made for loss motion. One way to do this is to connect the yoke 50 and the miter gear which it turns together in such a way that one is afforded a slight turning movement in respect to the other. As shown in Figures 3, 4 and 5, the parts are in what may be called neutral position with the vessel on its course. The motor 17 is deenergized and the spring biased brake 16 is applied to drum 18 which is adapted to be driven by motor 17 to actuate the rudder when the craft deviates from its course. Should the vessel deviate from its course one of the elements 44 or 45, for example, the element 44, will be turned counter-clockwise beyond the adjacent end of the screen 43 and thus energized. The effect of this is to energize the electro-magnet 51, (Figure 5) which closes the contact 20 and thus energizes the motor 17 and the release magnet of brake 16 and sets the motor in operation. A hold-over device is unnecessary because the cell 44, although it travels a large part of its circular path, cannot go beyond the beam or ray of light which is substantially fan shaped.

Figure 6:
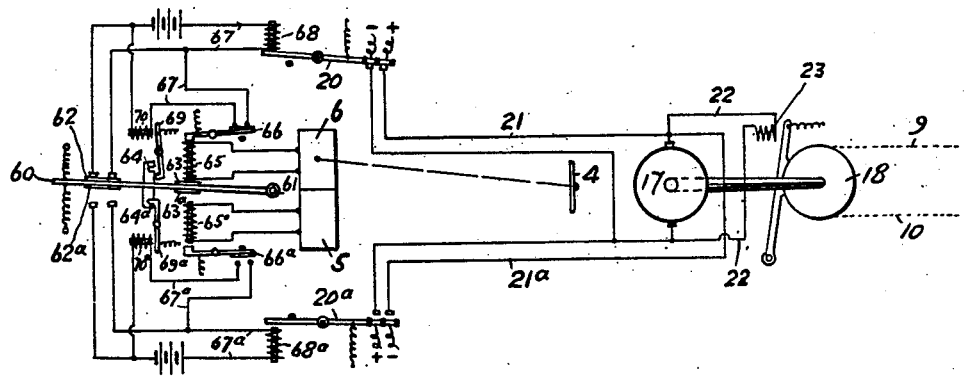
Figure 6 is a similar view of a lay-out embodying another modification involving hold-over devices.

The construction and mode of operation of the modification shown in Figure 6 are as above described except as follows:—The tongue 60 is pivoted at 61 and it is provided with contacts 62 and 62ª and with armatures 63 and 63ª and with latch elements 64 and 64ª. When the beam or ray from the reflector 4 falls upon both the cells or valves 5 and 6 at their junction the tongue 60 is in middle position and in this equilibrium position solenoids 65 and 65ª are both energized and contacts 66 and 66ª are closed energizing solenoids 70 and 70ª and holding latch 64 and 64ª out of engagement. When the beam or ray falls preponderatingly, for example, on the cell 6 the electro-magnet 65 is energized to a greater extent than electro-magnet 65ª and the tongue is moved into the position shown. The tongue 60 closes the circuit 67 energizing the electro-magnet 68 which closes the motor switch 20 and sets the motor in operation to turn the rudder. In this position of the beam the solenoid 65ª is deenergized and the latch element 64ª, under the action of its spring, engages and holds the tongue and everything controlled by it in the position described, even though the ray or beam passes beyond the cell or valve 6. Through the action of the follow-back mechanism the ray is brought back onto the cell or electronic device 5 causing it to close the circuit 67ª, energizing the electro-magnet 70ª which releases the catch 69ª. In the event of deviation of the course in the other direction the operation is repeated but with the devices indicated by number without the exponent a added. 66 and 66ª operate with a smaller quantity of light upon the cells than that required by tongue 60. 62 closes 68 and 66 does not close 68.

Figure 7:
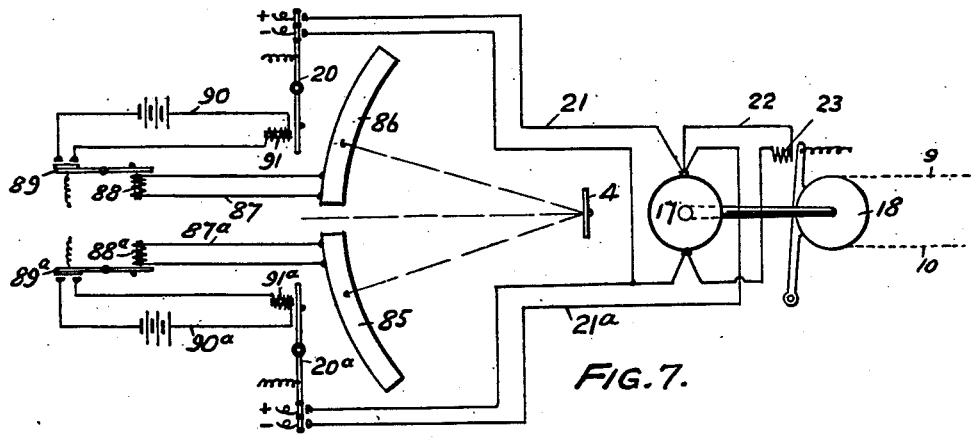
Figure 7 is a similar lay-out view illustrating another modification devoid of hold-over devices.

The construction and mode of operation of the modification shown in Figure 7 are as above described except as follows: The cells or electronic valve devices 85 and 86 are separated at their adjacent ends by an adjusted space and are so long that the beam or ray of light or radiant energy does not sweep out beyond their outer ends, consequently hold-over devices are unnecessary. Each cell is provided with a circuit 87 including an electro-magnet 88 which, when energized, attracts the spring opened contact 89, which closes the relay circuit 90 in which there is an electro-magnet 91 which controls the motor contact arm 20 and thus the motor is operated in the manner already described.

Figure 8:
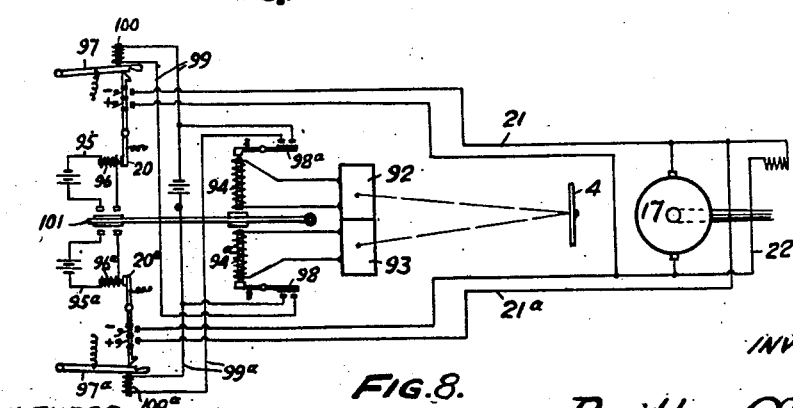
Figure 8 is a similar lay-out view illustrating another modification.

The construction and mode of operation of the modification shown in Figure 8 are as above described except as follows: The reflected beam or ray from the mirror may shine upon both of the cells or valves 92 and 93, and if the electro-motive force in the circuits 94, 94ª is balanced the pivotal tongue 101 occupies the position shown, but if the electro-motive force in one of these circuits, for example 94, preponderates, the electro-magnet in that circuit attracts the tongue and closes the relay circuit 95 by the contact on the tongue. The relay circuit 95 energizes the electro-magnet 96 which closes the motor contact 20. The latches 97 and 97ª are provided to hold the motor relays 20 and 20ª in closed positions in case the beam crosses completely over their respective actuating cells. Therefore, it is not necessary for these latches to function in latching until the beam is falling on one cell only. When the beam falls on cell 92 only, then the latch 97 latches the contact 20 in position shown. The latch 97 holds the contact 20 in closed position until a portion of the light or energy falls on the cell 93 and causes it to close its contact 98 which closes the relay circuit 99 in which is included the electro-magnet 100 which withdraws the latch 97 and permits the contact 20 to open under the action of its spring. 98 and 98ª are more sensitive than contact mechanism of tongue 101 and act with a small portion of the light upon the cells. When deviation from the course occurs in the other direction the described operation takes place in respect to the duplicate arrangement which is indicated by the same numbers with the exponent a. In the operation in the described device regard must be had to weather conditions; for example, in a rough sea more yaw is desirable than in a quiet sea, and the described apparatus may be adjusted for weather conditions by decreasing the sensitivity of the electrical circuits and by increasing the space between the cells. Initial rudder movement may be obtained by the described lag in the action of the follow-back mechanism so that the rudder may move through a certain angle before the follow-back mechanism acts.

It will be obvious to those skilled in the art, to which the invention relates, that modifications may be made in details of construction and arrangement and in matters of mere form without departing from the spirit of the invention which is not limited to such matters or otherwise than as the prior art and the appended claims may require.

I claim:

1. Apparatus for controllably actuating an element on a dirigible craft, such as a rudder, comprising means for providing a beam of radiant energy, means responsive to said beam movable relative to the beam in response to deviation of said craft from its course, means controllable by said beam-responsive means for actuating said element, means for maintaining said actuating means operative, follow-back means operable by said actuating means for relatively changing the position of said beam-responsive means and the incidence of the beam thereon to restore the normal relation therebetween, and means immediately responsive to the first restoration of said normal relation for rendering said maintaining means ineffective.

2. Apparatus for controllably actuating an element on a dirigible craft, such as a rudder, comprising means for providing a beam of radiant energy, a plurality of devices responsive to said beam movable relative to the beam in response to deviation of said craft from its course to cause said beam to selectively activate said devices, means controllable by an activated one of said devices for actuating said element, electromagnetic latching means for maintaining said actuating means operative, follow-back means operable by said actuating means for relatively changing the position of said devices and incidence of the beam thereon to restore the normal relation between said devices and said beam, and means responsive to the restoration of said normal relation for rendering said latching means ineffective.

3. Apparatus for controllably actuating an element on a dirigible craft, such as a rudder, comprising means for providing a beam of radiant energy, a plurality of devices responsive to said beam movable relative to the beam in response to deviation of said craft from its course to cause said beam to selectively activate said devices, means controllable by an activated one of said devices for actuating said element, said actuating means including a motor and control circuits therefor, latching means for maintaining said circuits energized, follow-back means operable by said actuating means for relatively changing the position of said devices and the incidence of the beam thereon to restore the normal relation between said devices and said beam, and means immediately responsive to the first restoration of said normal relation for rendering said latching means ineffective.

4. Apparatus for controllably actuating an element on a dirigible craft, such as a rudder, comprising means for providing a beam of radiant energy, a pair of juxtaposed devices responsive to said beam, means for directing said beam onto said devices, a movable member, actuating devices on opposite sides of said member controllable respectively by said beam-responsive devices, means for causing said beam to sweep across said beam-responsive devices in response to deviation of said craft from its course, whereby one of said beam-responsive devices is selectively activated to selectively actuate the device controllable thereby, means for maintaining said member in actuated position, means controlled by said member for actuating said element, follow-back means operable by said actuating means for returning said beam to its normal position, and means responsive to the return of said beam for rendering said maintaining means ineffective.

5. Apparatus for controllably actuating an element on a dirigible craft, such as a rudder, comprising a compass, means for propagating radiant energy from the axis of said compass, a pair of devices responsive to the propagated radiant energy, means for causing the radiant energy to activate said devices selectively in response to deviation of the craft from its course, means controllable by said devices for actuating said element, means for maintaining said actuating means operative, follow-back means operable by said actuating means for restoring the normal relation between the radiant energy and said devices, and means immediately responsive to the first restoration of said normal relation for rendering said maintaining means ineffective.

BRITTON CHANCE.